US008849085B2

(12) United States Patent
Meadowcroft et al.

(10) Patent No.: US 8,849,085 B2
(45) Date of Patent: Sep. 30, 2014

(54) FLEXIBLE DUST COVER FOR USE WITH A PARALLEL OPTICAL COMMUNICATIONS MODULE TO PREVENT AIRBORNE MATTER FROM ENTERING THE MODULE, AND A METHOD

(75) Inventors: David J. K. Meadowcroft, Santa Clara, CA (US); Paul Yu, Mountain View, CA (US); Hui Xu, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 308 days.

(21) Appl. No.: 13/301,844

(22) Filed: Nov. 22, 2011

(65) Prior Publication Data

US 2013/0129302 A1 May 23, 2013

(51) Int. Cl.
*G02B 6/00* (2006.01)
*H01R 13/52* (2006.01)

(52) U.S. Cl.
CPC .................................. *H01R 13/5213* (2013.01)
USPC ........................................... 385/134; 385/139

(58) Field of Classification Search
USPC ......................................... 385/134–137, 139
See application file for complete search history.

(56) References Cited

U.S. PATENT DOCUMENTS 4,640,575 A * 2/1987 Dumas .......................... 385/134
5,202,949 A * 4/1993 Hileman et al. .............. 385/134
7,164,840 B2 * 1/2007 Hsieh ............................ 385/134
7,288,756 B2 10/2007 Sherrer et al.
7,367,719 B1 5/2008 Liburdi
7,408,205 B2 8/2008 Webster et al.
7,537,397 B1 5/2009 Tsai
7,572,066 B2 * 8/2009 de Jong et al. .................. 385/88
7,841,777 B2 * 11/2010 Howard et al. ................. 385/75
2009/0202244 A1 8/2009 Jin et al.
2009/0297159 A1 12/2009 Margolin et al.
2010/0232800 A1 * 9/2010 Meadowcroft et al. ....... 398/139
2010/0272404 A1 10/2010 He et al.
2011/0069495 A1 3/2011 Hayasi et al.
2011/0268397 A1 * 11/2011 Meadowcroft et al. ......... 385/94

FOREIGN PATENT DOCUMENTS

CN 201083853 Y 7/2008

* cited by examiner

*Primary Examiner* — Daniel Petkovsek

(57) ABSTRACT

A flexible dust cover is provided for use with a parallel optical communications module for preventing airborne matter, such as dirt, dust, and gases from entering the module. The flexible dust cover fits snugly to the module to protect components of the module and the optical pathways of the module from airborne matter. The flexible dust cover has an elasticity that allows it to be temporarily deformed from its original shape to a stretched state by application of a stretching force to enable the module to be inserted into a central opening formed in the cover. The force is then removed, causing the cover to attempt to return to its original, non-stretched shape. When this happens, interior surfaces of the cover form a snug fit about exterior surfaces of the module. This snug fit fills in air gaps in the module that would otherwise be exposed to the environment.

19 Claims, 9 Drawing Sheets

FLEXIBLE DUST COVER FOR USE WITH A PARALLEL OPTICAL COMMUNICATIONS MODULE TO PREVENT AIRBORNE MATTER FROM ENTERING THE MODULE, AND A METHOD

TECHNICAL FIELD OF THE INVENTION

The invention relates to optical communications systems. More particularly, the invention relates to a flexible dust cover for use with a parallel optical communications module for preventing airborne matter, such as dirt, dust, and gases from entering the module.

BACKGROUND OF THE INVENTION

Parallel optical communications modules include parallel optical transmitter modules, parallel optical receiver modules and parallel optical transceiver modules. A typical parallel optical transmitter module includes a plurality of laser diodes for generating optical data signals, laser diode driver circuitry for driving the laser diodes, and a controller for controlling operations of the transmitter module. A typical parallel optical receiver module includes a plurality of photodiodes for receiving optical data signals, receiver circuitry for demodulating and decoding the received optical data signals, and a controller for controlling operations of the receiver module. Parallel optical transceiver modules typically include the components described above of the transmitter module and of the receiver module.

In many parallel optical communications modules, openings exist in the modules through which airborne dust, dirt, gases, or other particulates may enter the module. Ingress of such airborne matter into the module can sometimes cause problems in the modules. For example, ingress of dust into a part of the module that contains the laser diodes can potentially block light output from the laser diodes or received by the photodiodes, which, in turn, can lead to performance issues. Some modules have relatively open designs that enable them to be assembled at lower costs and that facilitate the evaporation of moisture in the modules. Therefore, while an open module design can be beneficial, such designs are susceptible to problems associated with the ingress of dust, dirt, gases and other airborne matter. In addition, some modules are required to pass mixed flow gas (MFG) tests, during which a module is placed in a chamber and exposed to aggressive chemical gases, such as fluorine and chlorine, for example. These gases can find their way into a module and erode metal components of the module (e.g., bond wires, conductors, etc.), thereby causing damage to the module that can lead to performance problems.

A need exists for a parallel optical communications module that has protection against ingress of airborne matter such as dust, dirt, gases, and other airborne particulates that can harm the components of the module and/or interfere with the optical path of the module.

SUMMARY OF THE INVENTION

The invention is directed to a flexible dust cover for use with an optical communications module for helping prevent dust, gases and other airborne matter from entering an interior of the module. The dust cover comprises an upper surface, a lower surface, a first side wall, a second side wall, a third side wall, a fourth side wall, and a central opening extending through the upper and lower surfaces of the dust cover. The central opening is defined by interior surfaces of the side walls of the dust cover. The flexible dust cover has an elasticity that enables the dust cover to be stretched from an original, non-stretched state to a stretched state by applying a stretching force to the dust cover. In the stretched state, the central opening has an increased size that is sufficiently large to allow an optical communications module to be disposed within the central opening. When the stretching force is no longer being applied to the dust cover, the dust cover attempts to return to the original, non-stretched state. If an optical communications module is disposed within the central opening when the dust cover attempts to return to its original, non-stretched state, then the interior surfaces of the side walls of the dust cover will tightly grip exterior surfaces of the optical communications module to help prevent dust, gases and other airborne matter from entering an interior of the module.

The invention is also directed to an optical communications module assembly that comprises an optical communications module and the dust cover. The dust cover is in the stretched state and the optical communications module is disposed within the central opening such that the interior surfaces of the side walls of the dust cover tightly grip exterior surfaces of the optical communications module to help prevent dust, gases and other airborne matter from entering an interior of the module.

The method comprises providing an optical communications module, providing a flexible dust cover having an elasticity that enables the dust cover to be stretched from an original, non-stretched state to a stretched state by applying a stretching force to the dust cover, applying a stretching force to the dust cover to stretch the dust cover from the original, non-stretched state to the stretched state, disposing the optical communications module within the central opening of the dust cover, and removing the stretching force to cause the interior surfaces of the side walls of the dust cover tightly grip exterior surfaces of the optical communications module. The tight grip helps prevent dust, gases and other airborne matter from entering an interior of the module.

These and other features and advantages of the invention will become apparent from the following description, drawings and claims.

DETAILED DESCRIPTION OF AN ILLUSTRATIVE EMBODIMENT

In accordance with the invention, a flexible dust cover is provided for use with a parallel optical communications module for preventing airborne matter, such as dirt, dust, and gases from entering the module. The flexible dust cover fits snugly to the module to protect components of the module and the optical pathways of the module from airborne matter. The flexible dust cover has an elasticity that allows the dust cover to be temporarily deformed, or stretched, from its original shape to a stretched state to enable the module to be inserted into a central opening formed in the cover. The force is then removed, causing the cover to attempt to return to its original, non-stretched shape. When this happens, interior surfaces of the cover form a snug fit about exterior surfaces of the module. This snug fit fills in air gaps in the module that would otherwise be exposed to the environment. In this way, the dust cover helps to prevent airborne matter from entering the module, thereby protecting the components of the module from airborne matter and preventing airborne matter from interfering with optical pathways of the module.

By helping prevent airborne contaminants from entering the interior of the module, the dust cover helps the module meet the benign dust test standard set forth in the Electronics Industries Alliance (EIA) standard 364-91A and mixed flow gas (MFG) testing standards. In addition, by helping to protect the optical pathways of the module, the dust cover helps ensure that high signal integrity is maintained.

Figure 1:
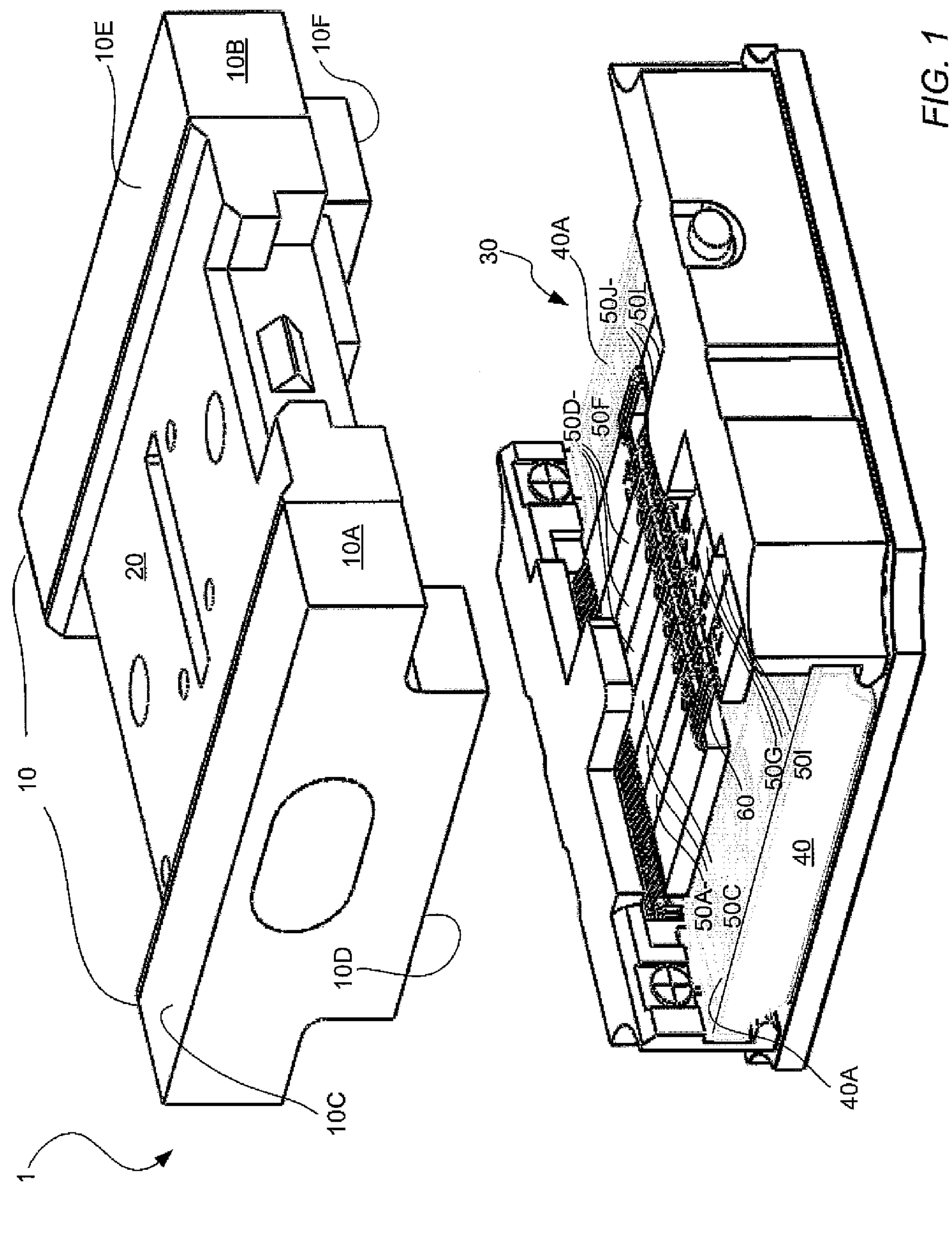
FIG. 1 illustrates a top perspective view of an illustrative embodiment of a parallel optical communications module that may be equipped with the dust cover.
Figure 2:
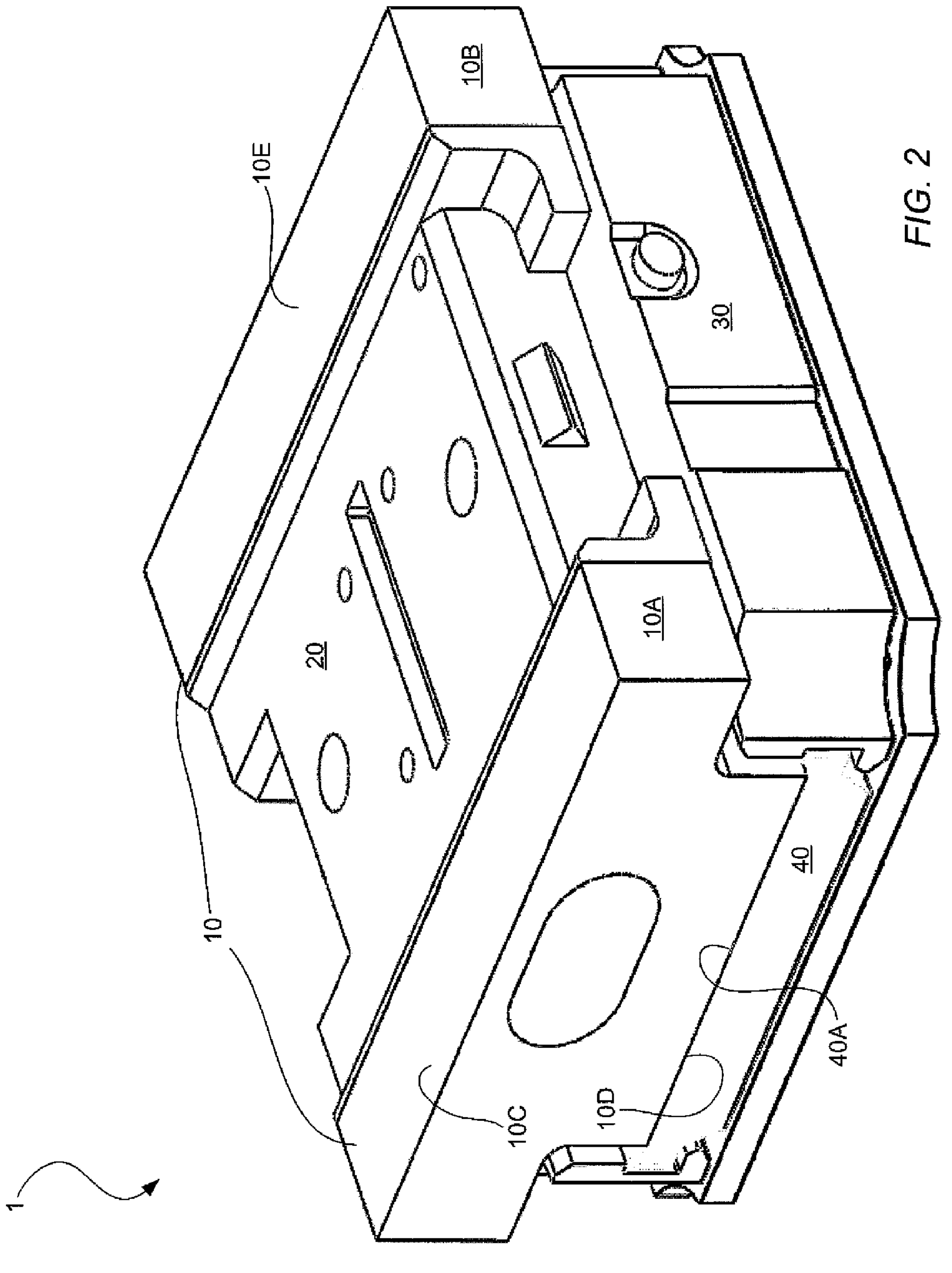
FIG. 2 illustrates a top perspective view of the parallel optical communications module shown in FIG. 1 after the heat dissipation system and optical subassembly shown in FIG. 1 have been secured to the module.
Figure 3:
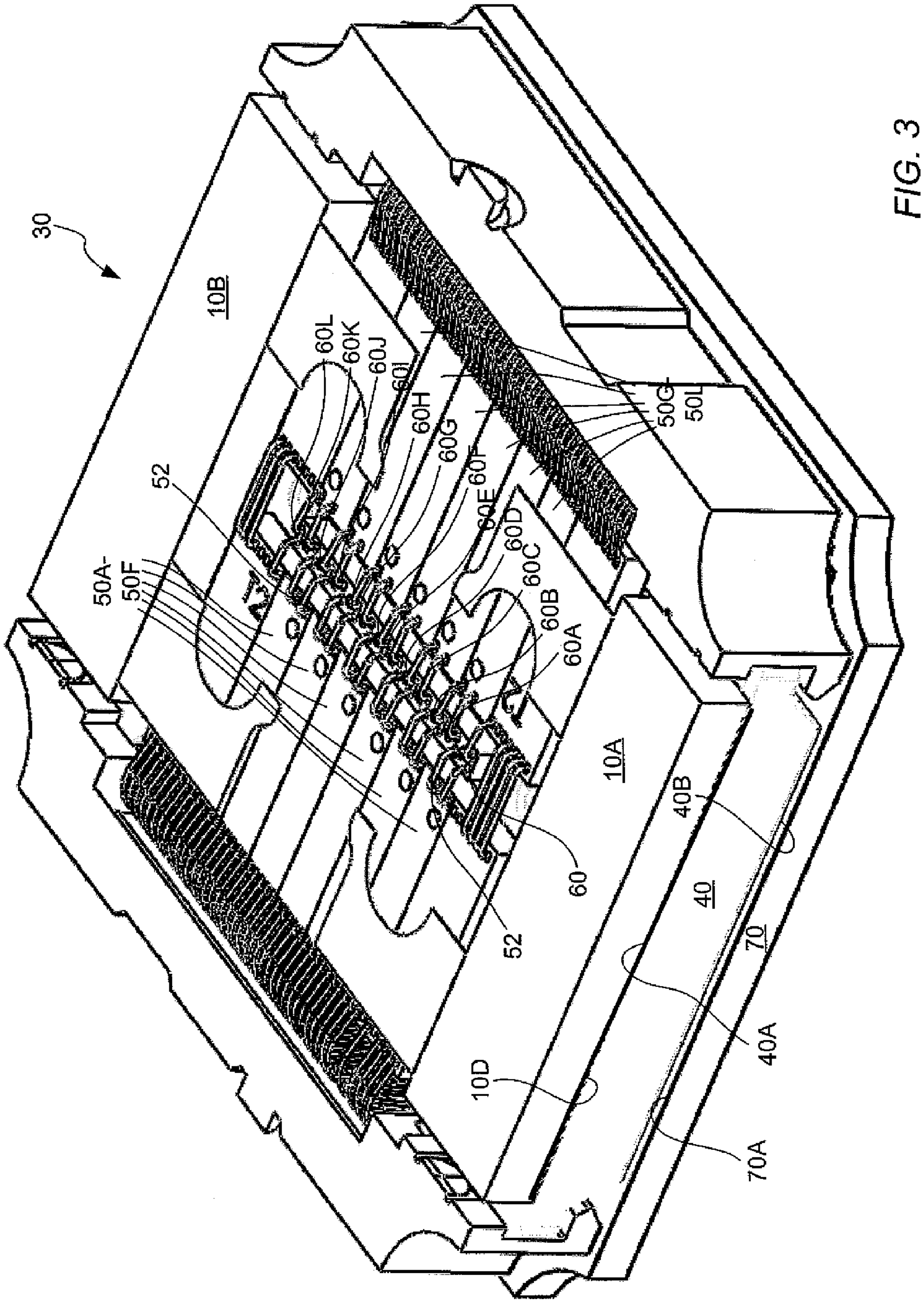
FIG. 3 illustrates a top perspective view of the parallel optical communications module shown in FIG. 2, which shows the lower surfaces of the heat blocks of the heat dissipation system secured to the upper surface of the leadframe of the optical transceiver module.

Prior to describing the dust cover, a parallel optical communications module with which the dust cover may be used will be described with reference to FIGS. 1-3. After describing the principles and concepts of the invention with reference to FIGS. 1-3, illustrative, or exemplary embodiments of the dust cover and the manner in which it is used with the parallel optical communications module will be described with reference to FIGS. 4-7. Like reference numerals in the figures represent like components, elements, or features.

FIG. 1 illustrates a perspective view of a parallel optical communications module 1 in accordance with an illustrative embodiment that may be equipped with the protective dust cover (not shown). In accordance with this illustrative embodiment, the module 1 is a parallel optical transmitter module. The module 1 includes a heat dissipation system 10, an optical subassembly (OSA) 20 to which the heat dissipation system 10 is mechanically coupled, and an electrical subassembly (ESA) 30 configured to be mechanically coupled to the heat dissipation system 10 and to the OSA 20. The heat dissipation system 10 includes heat blocks 10*a* and 10*b* that are mechanically coupled to the sides of the OSA 20. The heat block 10*a* has an upper surface 10*c* and a lower surface 10*d*. Likewise, the heat block 10*b* has an upper surface 10*e* and a lower surface 10*f*.

The ESA 30 includes a leadframe 40 having an upper surface 40*a* on which a plurality of laser diode driver ICs 50*a*-501 are mounted. An array of laser diodes 60 is also mounted on the upper surface 40*a* of the leadframe 40. In accordance with this illustrative embodiment, the module 1 includes twelve laser diodes 60 for producing twelve optical data signals. When the OSA 20 having the heat dissipation system 10 secured thereto is attached to the ESA 30, the lower surfaces 10*d* and 10*f* of the heat blocks 10*a* and 10*b*, respectively, are in contact with the upper surface 40*a* of the leadframe 40, as will be described below with reference to FIG. 2. The OSA 20 is configured to receive an optical connector (not shown) that terminates an end of a twelve-fiber ribbon cable (not shown). The OSA 20 includes optical elements (not shown) for directing light produced by the twelve laser diodes onto the respective ends of twelve respective optical fibers of the ribbon cable.

FIG. 2 illustrates a perspective view of the parallel optical communications module 1 shown in FIG. 1 showing the heat dissipation system 10 secured to the OSA 20 and showing the combination of the heat dissipation system 10 and the OSA 20 secured to the ESA 30. In FIG. 2, the lower surfaces 10*d* and 10*f* of the heat blocks 10*a* and 10*b*, respectively, are shown in contact with the upper surface 40*a* of the leadframe 40. Typically, a thermally conductive attachment material, such as a thermally conductive epoxy, for example, is used to secure the lower surfaces 10*d* and 10*f* of the heat blocks 10*a* and 10*b*, respectively, to the upper surface 40*a* of the leadframe 40.

FIG. 3 illustrates a perspective view of the parallel optical communications module 1 shown in FIG. 2, but with the upper portions of the heat blocks 10*a* and 10*b* and the OSA 20 (FIGS. 1 and 2) removed to more clearly show the electrical circuitry mounted on the upper surface 40*a* of the leadframe 40. In accordance with this illustrative embodiment, the module 1 has only transmitter functionality and does not include receiver functionality. The module 1 includes twelve laser diode driver ICs 50*a*-501 and twelve laser diodes 60*a*-601 to provide twelve transmit channels. The laser diode driver ICs 50*a*-501 have driver pads (not shown) that are electrically coupled by wire bonds 52 to contact pads (not shown) of the laser diodes 60*a*-601 for delivering electrical signals to the laser diodes 60*a*-601, such as the laser diode bias and modulation current signals. The laser diodes 60*a*-601 are typically vertical cavity surface emitting laser diodes (VCSELs) and may be integrated as an array into a single IC 60. The module 1 also includes a circuit board 70, which is typically a ball grid array (BGA), a land grid array (LGA), or the like. The lower surface 40*b* of the leadframe 40 is secured to the upper surface 70*a* of the circuit board 70.

It should be noted that the invention is not limited to the configuration of the parallel optical communications module 1 shown in FIGS. 1-3. Although the module 1 shown in FIGS. 1-3 comprises only transmitter functionality, it may also include receiver functionality. For example, some or all of the laser diodes 60 may be replaced with photodiodes and a receiver IC may be added to the ESA or integrated with the laser diode driver ICs 50. The term "communications module", as that term is used herein, is intended to denote any of the following: (1) a module configured to transmit and receive signals, (2) a module configured to transmit signals, but not receive signals, and (3) a module configured to receive signals, but not transmit signals.

The OSA 20 (FIGS. 1 and 2) and the ESA 30 have alignment and locking features thereon (not shown) that align and interlock the OSA 20 and the ESA 30 to each other when they are coupled together. In this coupled state, the lower surfaces 10*d* and 10*f* of the heat blocks 10*a* and 10*b*, respectively, are in contact with the upper surface 40*a* of the leadframe 40. A variety of configurations of suitable alignment and locking features can be designed for mechanically aligning and interlocking the OSA 20 and the ESA 30 together, as will be understood by persons of ordinary skill in the art. Therefore, in the interest of brevity, a detailed discussion of the alignment and locking features will not be provided herein.

The thermal path for heat produced by the laser diode driver ICs 50*a*-501 (FIGS. 2 and 3) and the laser diode array 60 (FIG. 3) is as follows: from the laser diode driver ICs 50*a*-501 and from the laser diode array 60 down into the leadframe 40; from the upper surface 40*a* of the leadframe 40 up into the lower surfaces 10*d* and 10*f* of the heat blocks 10*a* and 10*b*, respectively; from the lower surfaces 10*d* and 10*f* of the heat blocks 10*a* and 10*b* to the upper surfaces 10*c* and 10*e* of the heat blocks 10*a* and 10*b*, respectively; and then from the upper surfaces 10*c* and 10*e* of the heat blocks 10*a* and 10*b*, respectively, into the customer's heat dissipation system (not shown).

The heat blocks 10*a* and 10*b* of the heat dissipation system 10 may be made of any thermally conductive material, such as copper, for example. In accordance with an embodiment, the heat blocks 10*a* and 10*b* are formed using a conventional blank stamping process. The blocks 10*a* and 10*b* are then nickel plated, which prevents the copper from oxidizing and prevents the copper atoms from migrating into the laser diodes 60*a*-601. Other materials, such as aluminum nitride, for example, may also be used for the heat blocks 10*a* and 10*b*.

Figure 4:
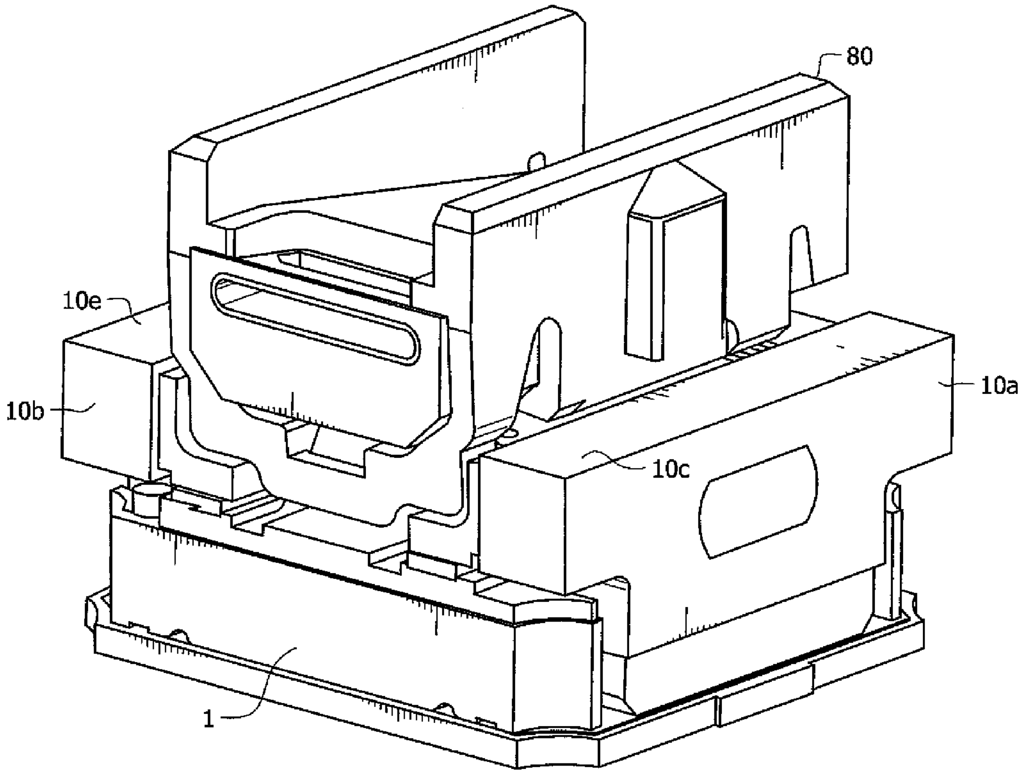
FIG. 4 illustrates a top perspective view of the parallel optical communications module shown in FIGS. 1-3 having an optical connector mechanically coupled therewith.

FIG. 4 illustrates a side perspective view of the module shown in FIGS. 1-3 having an optical connector 80 connected to it. The optical connector 80 is adapted to hold the ends of optical fibers (not shown) of an optical fiber ribbon cable (not shown). In accordance with the illustrative embodiment, the optical connector 80 holds the ends of twelve optical fibers. Optical elements (not shown) of the OSA 20 shown in FIGS. 1 and 2 couple light between the ends of the optical fibers and the laser diodes 60*a*-601.

There are several locations on the module 1 and at the interface between the module 1 and the connector 80 at which dust, gases and other matter may enter into the interior of the module 1. The intrusion of dust, gases and other matter into the interior of the module 1 can detrimentally affect components of the module 1, such as the laser diodes 60*a*-601, for example, and can interfere with the optical pathways that extend from the laser diodes 60*a*-601 to the optical elements (not shown) of the OSA 20 (FIGS. 1 and 2). As will now be described with reference to the illustrative embodiments shown in FIGS. 5-7, the flexible dust cover prevents or at least lessens the intrusion of dust, gases and other matter into the interior of the module 1 by sealing gaps along exterior portions of the module 1 and at the interfaces between the module 1 and the connector 80.

Figure 5:
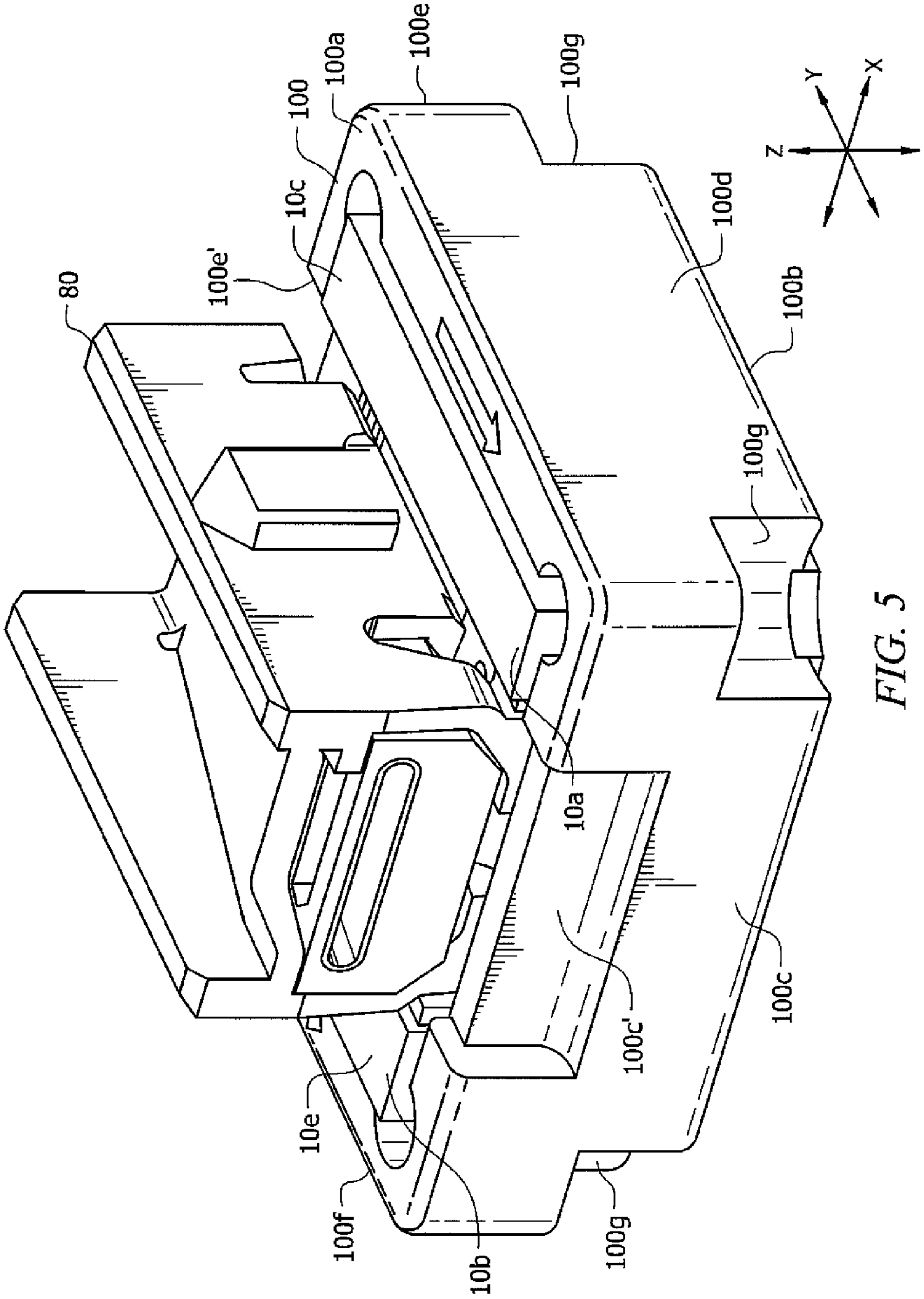
FIG. 5 illustrates a top perspective view of the parallel optical communications module and optical connector shown in FIG. 4 having a flexible dust cover secured to exterior surfaces of the module in accordance with an illustrative embodiment.

FIG. 5 illustrates a side perspective view of an optical communications module assembly 90 comprising the module 1 and connector 80 shown in FIG. 4 with a flexible dust cover 100 secured to exterior portions of the module 1. The dust cover 100 is flexible in that the material of which the dust cover 100 is made has an elasticity that allows it to be temporarily deformed from its original shape to a deformed shape when a force is applied to it and that causes it to return to its original, non-deformed shape when the force is removed. Specifically, the dust cover 100 is capable of being stretched in order to increase the size of a central opening (not shown) formed in the cover 100. While in the stretched state, the module 1 is inserted into the central opening. The stretching force is then removed, causing the cover 100 to attempt to return to its original shape. As the cover 100 attempts to return to its original shape, the interior surfaces of the cover 100 that define the central opening in the cover 100 press firmly against exterior surfaces of the module 1 to create a snug fit between the module 1 and the cover 100. This snug fit helps ensure that any air gaps that would otherwise exist in the exterior portions of the module 1 and at the interface between the module 1 and the optical connector 80 are sealed by the dust cover 100. This seal helps prevent dust, gases and other matter from entering into interior portions of the module 1 through these air gaps.

The flexible material that is used for the dust cover 100 may be plastic, rubber, or other materials that have a degree of elasticity that allows them to be deformed to a temporary shape by application of a force and then to return to their original shape when the force is no longer applied. The flexible dust cover 100 is not limited to the design shown in FIG. 5. The flexible dust cover 100 has upper and lower surfaces 100*a* and 100*b*, respectively, and side walls 100*c*-100*f*. Each of the side walls 100*c*-100*f* has an interior surface and an exterior surface.

One advantageous feature of the design of the dust cover 100 shown in FIG. 5 is that its upper surface 100*a* is in a plane along the Z-axis of an X-, Y-, Z-Cartesian coordinate system that is below the plane in which the upper surfaces 10*c* and 10*e* of the heat blocks 10*a* and 10*b*, respectively, are disposed. This feature ensures that a user has access to the upper surfaces 10*c* and 10*e* of the heat blocks 10*a* and 10*b* to enable the user to place an external heat dissipation system (not shown) in contact with the upper surfaces 10*c* and 10*e* in order to move heat away from the module 1 and into the external heat dissipation system.

Another advantageous feature of the design of the dust cover 100 shown in FIG. 5 is that at the interfaces of the module 1 and the connector 80 where there are no heat blocks, the side walls 100*c* and 100*e* have thinned portions 100*c*" and 100*e*' to allow the side walls 100*c* and 100*e* to deflect outwardly when the connector 80 is being connected to and disconnected from the module 1. The dust cover 100 may also have cut out regions 100*g* on its four corners that match respective cut out regions formed on the four corners of the module 1, as shown in FIGS. 1-4. This feature allows the dust cover 100 to be compatible with existing socket designs that are currently used for interfacing optical communications modules with circuit boards.

Another advantageous feature of the dust cover 100 is that because it is made to be flexed, or deformed, during use, its shape and dimensions need not be extremely precise. Therefore, the manufacturing process and tools that are used to manufacture the cover 100 need not be extremely precise, which allows molding tool costs and piece part costs to be kept relatively low. The dust cover 100 is typically made of a highly pliable plastic or rubber material that has a relatively low Young's modulus of elasticity. One suitable plastic material for this purpose is Santoprene® thermoplastic elastomer (TPE). Santoprene® is a registered trademark of Exxon Mobil Corporation. Other flexible plastic and rubber materials are also suitable for use in making the dust cover 100.

Figure 6A:
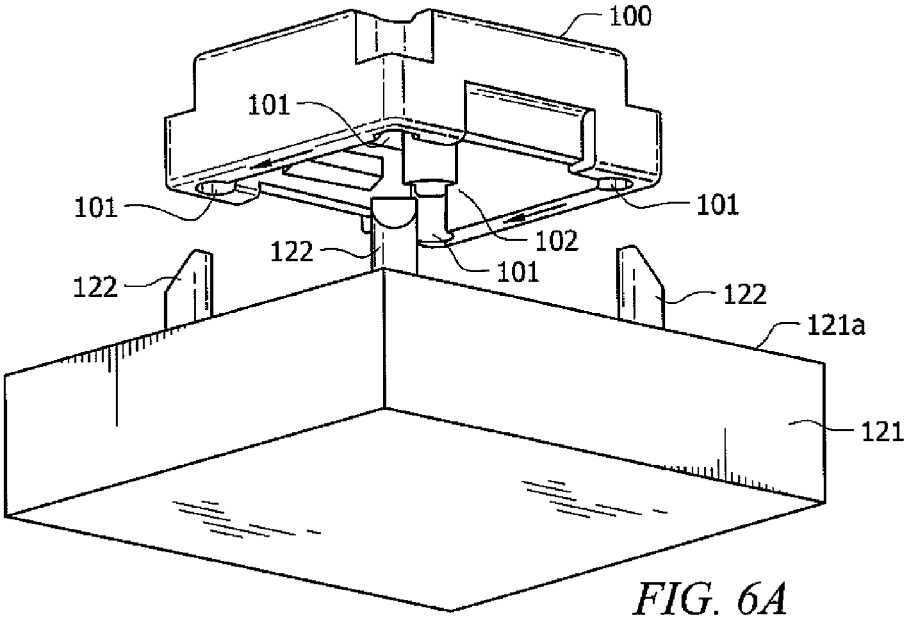
FIG. 6A illustrates a perspective view of a rigid base support and the dust cover shown in FIG. 5 about to be installed on the base support.

An example of the manner in which the dust cover 100 shown in FIG. 5 is stretched, or deformed, during the process of securing it about the module 1 will now be described with reference to FIGS. 6A-6D. FIG. 6A illustrates a perspective view of a rigid base support 121 and the dust cover 100 about to be installed on the base support 121. The base support 121 has four posts 122 disposed near the four corners of the base support 121 on its upper surface 121*a*. Each of the posts 122 has an upper end that is tapered on one side thereof. In accordance with the illustrative embodiment, the dust cover 100 is generally rectangular such that the central opening has a shape that matches the shape of the exterior of the module 1, which, in accordance with the illustrative embodiment, is also generally rectangular in shape. The exterior of the dust cover 100 is not limited to having any particular shape, but the interior of the dust cover 100 will typically have a shape that matches the shape of the exterior of the module 1 so that the interior of the dust cover 100 conforms to the exterior of the module 1.

In accordance with the illustrative embodiment, the dust cover 100 has four peripheral openings 101 formed in the periphery thereof (e.g., in the corners) for receiving the respective posts 122. However, the distances between adjacent posts 122 are slightly greater than the distances between adjacent peripheral openings 101. Consequently, in order to install the dust cover 100 on the base support 121 with the posts 122 passing through the respective peripheral openings 101, the dust cover 100 must be stretched outwardly, which increases the size of a central opening 102 formed in the cover 100.

Figure 6B:
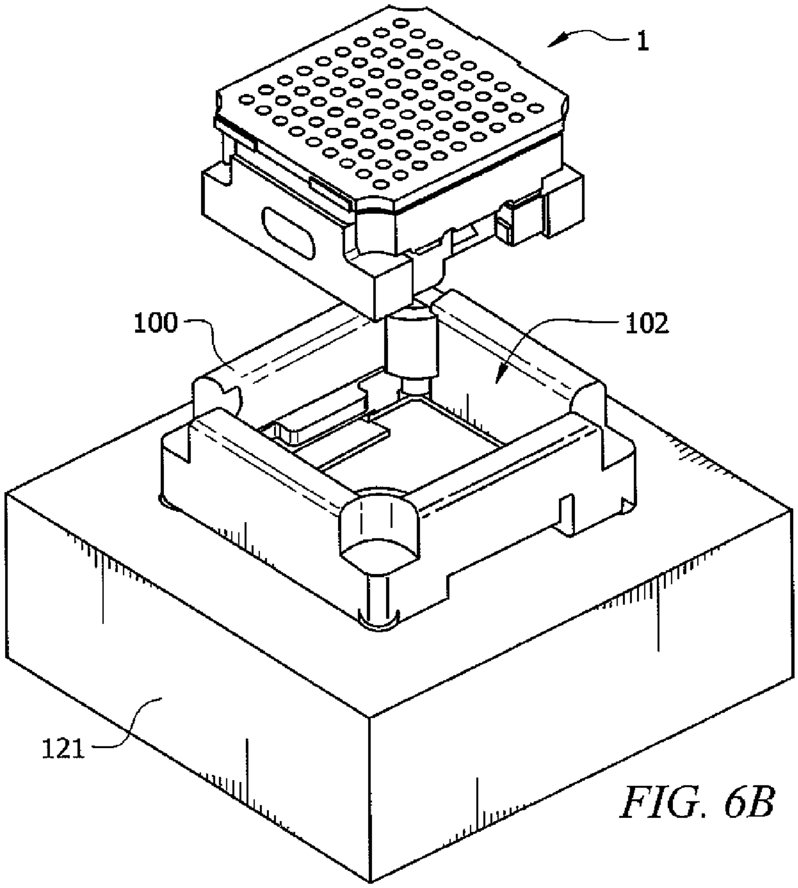
FIG. 6B illustrates a perspective view of the base support shown in FIG. 6A having the dust cover shown in FIG. 6A installed thereon and the module shown in FIG. 2 about to be inserted into a central opening of the dust cover 100.
Figure 6C:
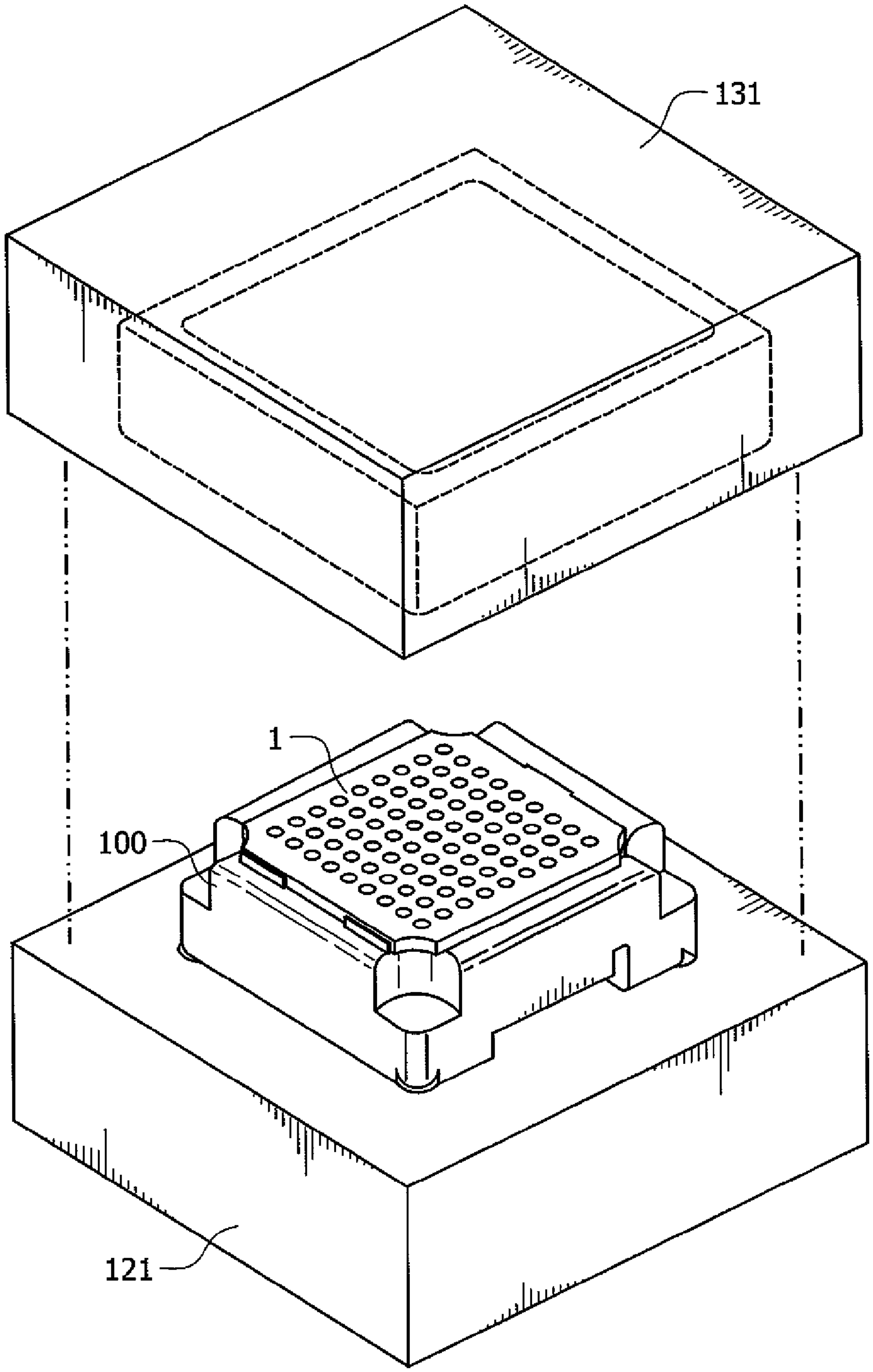
FIG. 6C illustrates a perspective view of the base support shown in FIG. 6B having the dust cover shown in FIG. 6B disposed thereon and the module shown in FIG. 6B disposed within the central opening of the dust cover.

FIG. 6B illustrates a perspective view of the base support 121 having the dust cover 100 installed thereon. FIG. 6B also shows a perspective view of the module 1 about to be inserted into the central opening 102 of the dust cover 100. With the dust cover 100 stretched outwardly, the central opening 102 is sufficiently large that the module 1 can be inserted into the central opening 102 without much interference between the module 1 and the dust cover 100. FIG. 6C illustrates a perspective view of the base support 121 having the dust cover 100 disposed thereon and the module 1 disposed within the central opening 102. FIG. 6C also illustrates a perspective view of an optional assembly cover 131 that is about to be secured to the dust cover 100.

Figure 6D:
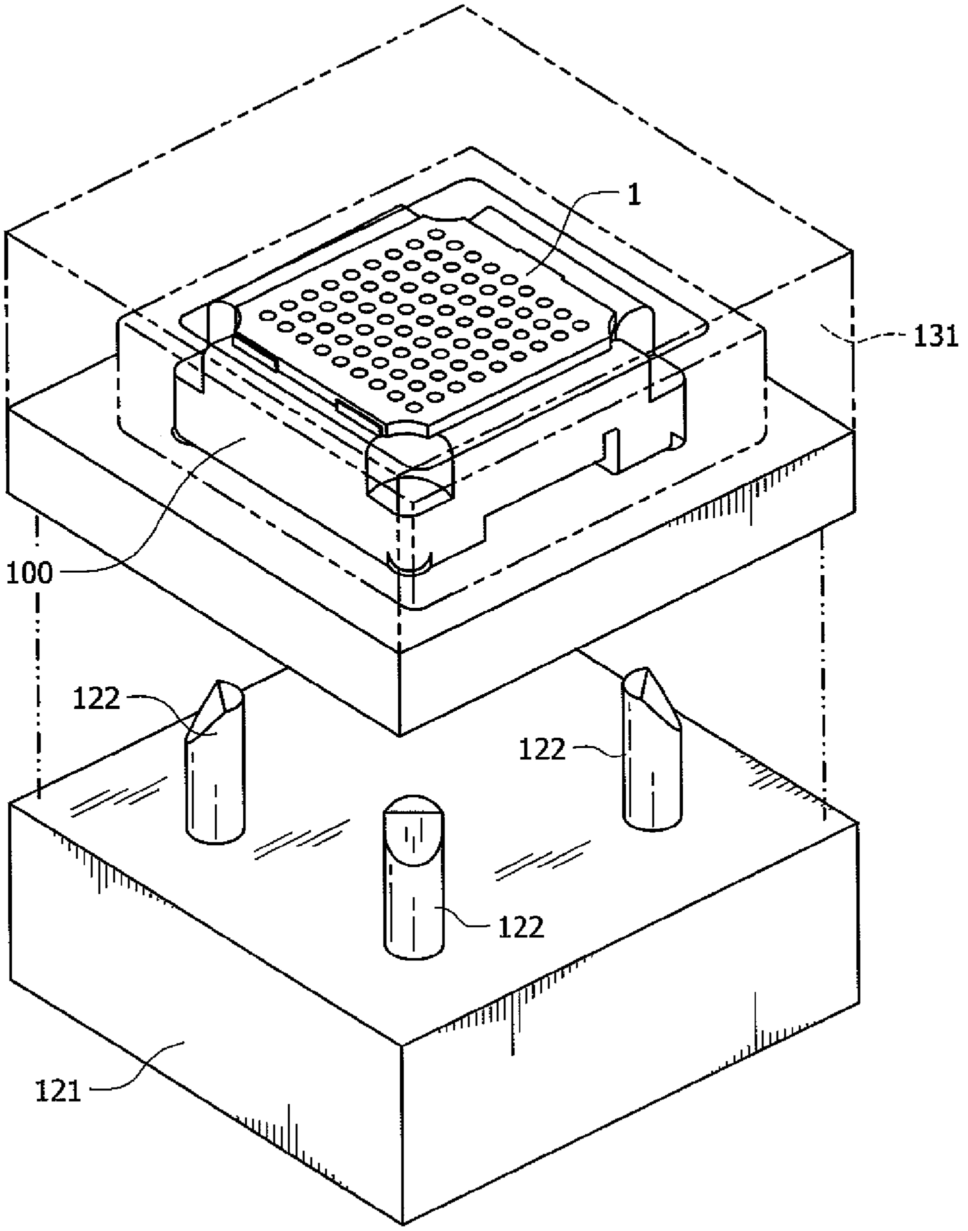
FIG. 6D illustrates a perspective view of the module, dust cover and assembly cover shown in FIG. 6C just after the base support has been separated from the dust cover.

FIG. 6D illustrates a perspective view of the module 1 having the dust cover 100 secured thereto and the assembly cover 131 secured to the dust cover 100. FIG. 6D also illustrates the base support 121 after it has been separated from the dust cover 100. When the base support 121 is separated from the dust cover 100, the forces that were exerted by the posts 122 are removed. When those forces are removed, the elasticity of the dust cover 100 causes it to attempt to return to its original, non-stretched state. This causes the dust cover 100 to tightly grip exterior surfaces of the module 1 such that air gaps in the module 1 and at the interfaces between the module 1 and the connector 80 (FIGS. 4 and 5) are filled in by portions of the dust cover 100 to prevent dust, gases and other matter from entering into the interior regions of the module 1.

Figure 7:
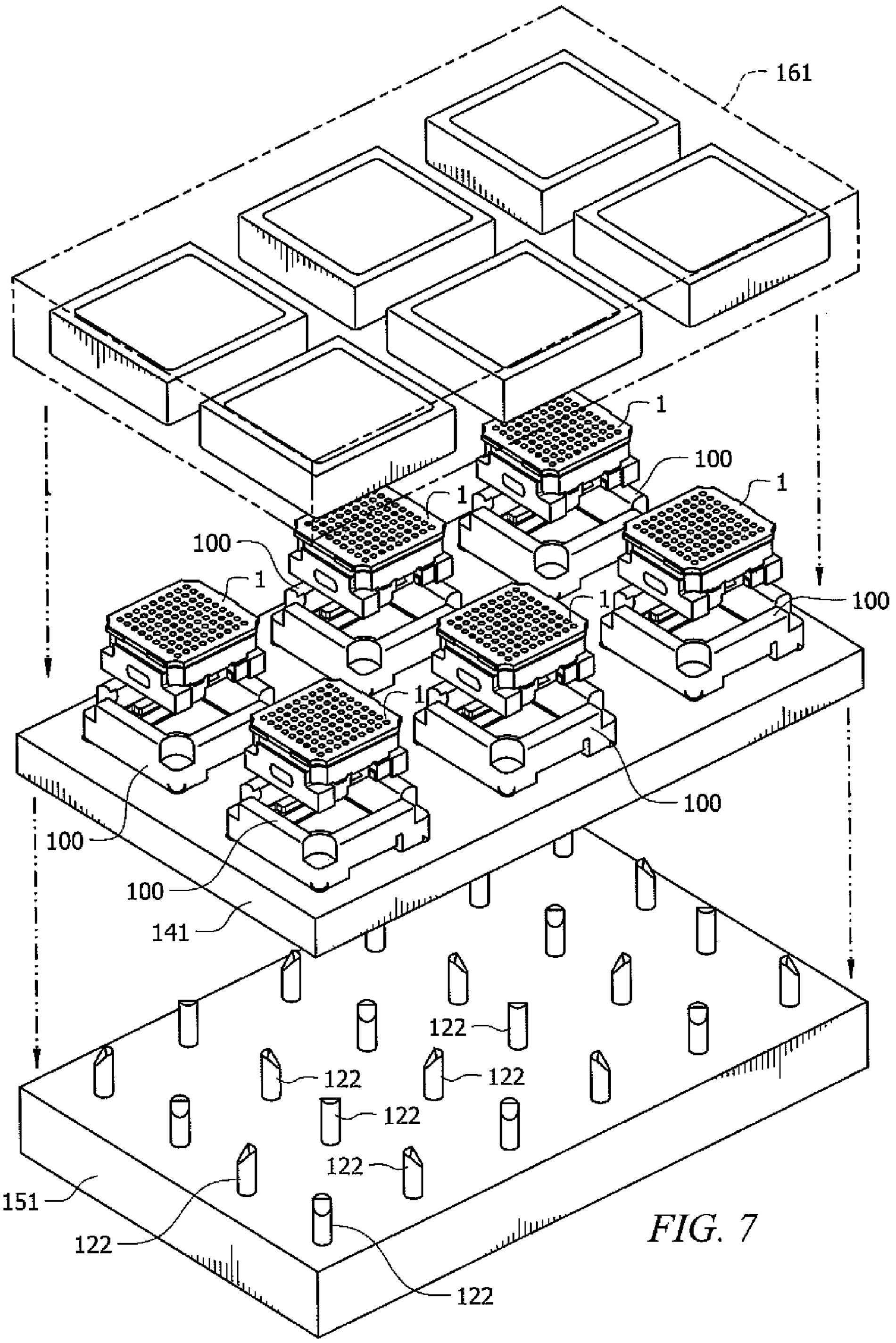
FIG. 7 illustrates a perspective view a parallel optical communications system that includes a six of the modules and dust covers shown in FIG. 6D positioned above a base support that is used to simultaneously secure the dust covers to the respective modules.

FIG. 7 illustrates a perspective view of a parallel optical communications system that includes six of the modules 1 and six of the dust covers 100 described above with reference to FIGS. 1-6D. In accordance with this illustrative embodiment, six of the dust covers 100 are mounted on a first base support 141. A second base support 151 is provided that is similar to the base support 121 shown in FIGS. 6A-6D, except that the second base support 151 is much larger and includes twenty four of the posts 122. The second base support 151 is installed on the first base support 141, which causes the respective posts 122 to be received in the respective peripheral openings 101 formed in the respective corners of the dust cover 100. As the posts 122 enter the respective peripheral openings 101, the posts 122 outwardly stretch the respective dust covers 100 such that the respective central openings 102 are increased in size. The respective modules 1 are then inserted into the respective central openings 102 and an assembly cover 161 that comprises six of the assembly covers 131 shown in FIGS. 6C and 6D is secured to the respective dust covers 100. The second base support 151 is then separated from the first base support 141, which causes the dust covers 100 to attempt to return to their original, non-stretched states and tightly grip exterior surfaces of the module 1.

It should be noted that FIGS. 6A-7 illustrate a few examples of ways in which the flexible dust covers 100 can be stretched outwardly to temporarily increase the sizes of the central openings 102 to allow the modules 100 to be inserted therein. The invention is not limited with respect to the way in which this task is performed. Other techniques and devices may be used to outwardly stretch the dust covers 100 to increase the sizes of the respective central openings 102. For example, this task may be performed by hand with fingers or manually by using a tool similar to a shoe horn to stretch the dust cover 100 to increase the size of the central opening 102 and then secure it about the module 1. Those skilled in the art will understand, in view of the description being provided herein, that this task may be performed in a variety of ways using a variety of tools or by hand.

It should be noted that the invention has been described with respect to illustrative embodiments for the purpose of describing the principles and concepts of the invention. The invention is not limited to these embodiments. For example, the dust cover 100 is not limited to having the design and shape shown in the figures, and also is not limited with respect to the design or shape of the optical communications module with which the dust cover is used. As will be understood by those skilled in the art in view of the description being provided herein, many modifications may be made to the embodiments described herein while still providing a dust cover that achieves the goals of the invention, and all such modifications are within the scope of the invention.

What is claimed is:

1. A flexible dust cover for use with an optical communications module, the dust cover comprising:

an upper surface, a lower surface, a first side wall, a second side wall, a third side wall, a fourth side wall, and a central opening extending through the upper and lower surfaces, the central opening being defined by interior surfaces of the side walls of the dust cover, and wherein the flexible dust cover has an elasticity that enables the dust cover to be stretched from an original, non-stretched state to a stretched state by applying a stretching force to the dust cover, and wherein in the stretched state the central opening has an increased size that allows an optical communications module to be disposed within the central opening, and wherein when the stretching force is no longer being applied to the dust cover, the dust cover attempts to return to the original, non-stretched state, and wherein if an optical communications module is disposed within the central opening when the dust cover attempts to return to its original, non-stretched state, then the interior surfaces of the side walls of the dust cover will grip exterior surfaces of the optical communications module disposed within the central opening to help prevent dust, gases or airborne matter from entering an interior of the module.

2. The flexible dust cover of claim 1, wherein the dust cover is made of a plastic material.

3. The flexible dust cover of claim 1, wherein the dust cover is made of a thermoplastic elastomer material.

4. The flexible dust cover of claim 1, wherein the dust cover is made of a rubber material.

5. The flexible dust cover of claim 1, wherein the dust cover has a plurality of peripheral openings formed in a periphery thereof for receiving respective posts that may be used to stretch the dust cover from its original, non-stretched state to the stretched state to increase the size of the central opening.

6. The flexible dust cover of claim 1, wherein the dust cover is rectangular in shape and wherein the central opening is rectangular in shape.

7. The flexible dust cover of claim 1, wherein two of the side walls of the dust cover that oppose one another have portions that are thinner than the other two side walls, and wherein the thinner portions increase an elasticity of the dust cover to facilitate connecting the optical communications module with an optical connector.

8. An optical communications module assembly comprising:

an optical communications module comprising:

a leadframe, an electrical subassembly (ESA), and an optical subassembly (OSA); and a flexible dust cover, the flexile dust cover having an upper surface, a lower surface, a first side wall, a second side wall, a third side wall, a fourth side wall, and a central opening extending through the upper and lower surfaces of the dust cover, the central opening being defined by interior surfaces of the side walls of the dust cover, and wherein the flexible dust cover has an elasticity that enables the dust cover to be stretched from an original, non-stretched state to a stretched state by applying a stretching force to the dust cover, and wherein the dust cover is in the stretched state and the optical communications module is disposed within the central opening such that the interior surfaces of the side walls of the dust cover grip exterior surfaces of the optical communications module to help prevent dust, gases or airborne matter from entering an interior of the module.

9. The optical communications module assembly of claim 8, wherein the dust cover is made of a plastic material.

10. The optical communications module assembly of claim 8, wherein the dust cover is made of a thermoplastic elastomer material.

11. The optical communications module assembly of claim 8, wherein the dust cover is made of a rubber material.

12. The optical communications module assembly of claim 8, wherein the dust cover has a plurality of peripheral openings formed in a periphery thereof for receiving respective posts that may be used to stretch the dust cover from its original, non-stretched state to the stretched state to increase the size of the central opening.

13. The optical communications module assembly of claim 8, wherein the dust cover is rectangular in shape and wherein the central opening is rectangular in shape.

14. The optical communications module assembly of claim 8, wherein two of the side walls of the dust cover that oppose one another have portions that are thinner than the other two side walls, and wherein the thinner portions increase an elasticity of the dust cover to facilitate connecting the optical communications module with an optical connector.

15. The optical communications module assembly of claim 8, wherein the side walls of the dust cover are made of molded plastic.

16. A method for helping to prevent dust, gases or airborne matter from entering an interior of an optical communications module, the method comprising:

providing an optical communications module;

providing a flexible dust cover, the flexile dust cover having an upper surface, a lower surface, a first side wall, a second side wall, a third side wall, a fourth side wall, and a central opening extending through the upper and lower surfaces of the dust cover, the central opening being defined by interior surfaces of the side walls of the dust cover, and wherein the flexible dust cover has an elasticity that enables the dust cover to be stretched from an original, non-stretched state to a stretched state by applying a stretching force to the dust cover;

applying a stretching force to be applied to the dust cover to stretch the dust cover from the original, non-stretched state to the stretched state;

disposing the optical communications module within the central opening of the dust cover; and removing the stretching force to cause the interior surfaces of the side walls of the dust cover grip exterior surfaces of the optical communications module, and wherein the grip helps prevent dust, gases or airborne matter from entering an interior of the module.

17. The method of claim 16, wherein the dust cover is made of a plastic material.

18. The method of claim 16, wherein the dust cover is made of a thermoplastic elastomer material.

19. The method of claim 16, wherein the dust cover is made of a rubber material.

* * * * *